United States Patent [19]
Dyksterhouse

[11] 3,720,917
[45] March 13, 1973

[54] DIRECTIONAL SIGNAL APPARATUS
[76] Inventor: Robert M. Dyksterhouse, Blue-Dot Farms, Route 3, Charlevoix, Mich.
[22] Filed: Aug. 14, 1970
[21] Appl. No.: 63,838

[52] U.S. Cl. .................340/67, 340/73, 340/82
[51] Int. Cl. .............................B06q 1/38
[58] Field of Search................340/67, 73, 81, 82

[56] References Cited

UNITED STATES PATENTS

3,510,839   5/1970   Elliott et al. ............340/81 R
3,387,260   6/1968   Wood........................340/82

Primary Examiner—John W. Caldwell
Assistant Examiner—Michael Slobasky
Attorney—Harness, Dickey & Pierce

[57] ABSTRACT

A switch which is mounted on the steering column of a vehicle and may be actuated to indicate either right or left turn information, right or left lane changing information or emergency information. The switch is transferred to the lane-change or turn mode by an actuator member which moves ball contact assemblies into various contact relations thereby making electrical contact to the various lights of the vehicle. The system also includes a circuit interconnecting the various lamps on the vehicle through a flasher, the energization of the lights being controlled by the turn signal switch. In one case a standard and emergency flasher are utilized and in the other case two standard flashers are utilized and a system is provided to short one of the lamps by means of the flasher thereby giving a sequential affect to the energization of the inboard and outboard lamps.

16 Claims, 9 Drawing Figures

INVENTOR.
Robert M. Dyksterhouse.
BY
Harness, Dickey & Pierce
ATTORNEYS.

DIRECTIONAL SIGNAL APPARATUS

The purpose of the foregoing abstract is to enable the Patent Office and the public generally, and especially the scientists, engineers or practitioners in the art who are not familiar with patent or legal terms of phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE INVENTION

This invention relates generally to a directional indicating switch and circuit and more particularly to a ball contact type of turn indicating switch and an improved flasher and sequential circuit for interconnecting the lamps of the vehicle with the source of power.

Conventional turn signal switches of the type presently being utilized on vehicles, while performing the necessary switching functions, are prone to a number of defects. For example, the conventional armature type of switch is subject to broken switch blades and dirty contacts thereby rendering the device inoperative. Furthermore, certain mechanisms within the switch may jam the steering mechanism under certain fault conditions of the switch. Also, prior conventional type of turn signal switches have been designed to be utilized in conjunction with specific automobile models while universality of turn signal switches for all vehicles is desired.

With the system of the present invention, many of these defects have been alleviated and a simple, compact, integral structure has been provided which includes all of the necessary functions for signaling the intentions of a vehicle operator. For example, the switch of the present invention includes the right and left turn signal functions, a lane changing function and an emergency four-way flash function.

Further, in conventional turn signaling systems, certain automotive manufacturers have incorporated a sequential energization of a plurality of indicating lamps on the right rear and left rear of the vehicle, depending on the direction of the turn intended. However, these systems have involved the use of complicated electronic timing circuits, thus increasing the manufacturing costs, installation and maintenance time and cost.

With the system of the present invention, an extremely simple and highly reliable sequencer circuit has been provided which minimizes the aforementioned problems.

Accordingly, it is one object of the present invention to provide an improved directional turn signal indicator switch.

It is another object of the present invention to provide an improved ball contact type of directional indicator switch.

It is still a further object of the present invention to provide an improved directional turn signal indicating switch which is compact, highly integrated and easily attached to the steering mechanism of the vehicle.

It is a further object of the present invention to provide an improved ball-type turn signal switch which includes all of the functions of lane changing, turn and emergency four-way flash indication in a single unit.

It is still a further object of the present invention to provide an improved ball type turn indicating switch having improved electrical circuit contacting characteristics.

It is another object of the present invention to provide an improved turn signal indicating switch which is simple to manufacture, easy to install and highly reliable.

It is still a further object of the present invention to provide an improved control circuit for a turn signal indicating system utilizing the ball type turn signal indicating switch described above.

It is still another object of the present invention to provide an improved sequential system for indicating a turn of a vehicle.

It is a further object of the present invention to provide an improved sequencer system utilizing a minimum number of elements.

It is still a further object of the present invention to provide an improved turn signal control system which is reliable in operation and utilizes a minimum number of wires to provide the control function for the various lamps of the vehicle.

Further objects, features and advantages of this invention will become apparent from a consideration of the following description, the appended claims and the accompanying drawings in which:

FIG. 7 is a schematic diagram illustrating the interconnection of the switch assembly of FIGS. 1 through 6 into circuit with the flashers and lamps of the vehicle;

Referring to the drawings and particularly to FIGS. 1 to 6 thereof, the improved turn signal indicator and emergency flasher device of the present invention includes a housing 10 which is adapted to be mounted coaxially with the steering shaft 12 of an automobile. The base 10 has a cylindrical recess 14 at one side thereof which receives a generally cylindrical drum 16 of an actuator 18 to pivotally mount the actuator 18 relative to the housing 10. The drum 16 may be formed integrally with the actuator 18 or otherwise suitably secured thereto for movement therewith. The actuator 18 is provided with a handle 20 for manually moving the actuator 18 to operate turn signal device. The actuator 18 is urged toward and yieldably held in a central or neutral position by a pair of balls 22 mounted in said base 10, the balls 22 being urged into angularly spaced V-shaped notches 24 formed in the cylindrical surface of the drum 16 by springs 26 supported in apertures 27 formed in the base 10.

The base 10 has a central opening 28 in which the steering shaft 12 may rotate and, at the opposite side of the central opening 28 from the actuator drum recess 14, the base 10 carries an emergency flasher control member 30 and the hereinafter described contact elements which provide the desired switching actions in response to manual operation of the turn signal actuator 18 and the emergency flasher control member 30.

In the preferred embodiment illustrated in FIGS. 1 to 6, the base 10 has an elongated arcuate slot 32 extending equal distances on opposite sides of a centerline 34 through the center of the opening 28 and through the center of the actuator drum recess 14. It will be noted that the slot 32 describes an arc of a circle having a center approximately at the center of drum 16. The contacts for indicating a right turn are mounted in the base 10 to the left of this centerline 34 as viewed in FIGS. 1 and 3 and include a first strip contact 36 mounted in the base 10 with its opposite ends 38 and 40 received in cooperating recesses 42 and 44. Intermediate its ends 38 and 40, the contact 36 extends along the inner side of the arcuate slot 32 and includes a detent portion 46 in the form of an angular bend extending toward the opposite side of the slot 32. The end portion 38 of the contact 36 is connected to a terminal post 48 in a suitable manner as by a friction fit or soldering, and the intermediate portion, including portion 46, is spaced from the inner side of the arcuate slot 32 to permit limited resilient movement of the strip 36.

A second strip contact 50 extends along the outer side of the slot 32 and includes a detent portion 52 extending toward the detent portion 46 of the contact 36. The outer end 54 of the contact 50 is received in a cooperating recess 56 and inwardly of the detent 52 the contact strip 50 extends through a slot 58 and terminates in an inner end loop 60 which is disposed adjacent the centerline 34 and projects into the slot 32. Also, the loop 60 is connected to terminal post 62 in a manner similar to strip 36.

The right turn contact group also includes a third strip contact 64 which extends along the bottom of the slot 32 between contacts 36 and 50 and the detents 46 and 52 thereof. The contact 64 has an end portion 66 extending transversely of the slot 32 in a slot 68 and connected to a terminal post 70. The right turn contact group also includes a contact ball 72 movable along the slot 32 by the actuator 18, as hereinafter described, to simultaneously engage the contact strips 36, 50 and 64 when the lever 20 has been moved to the right turn or lane-change mode of operation.

Figure 1:
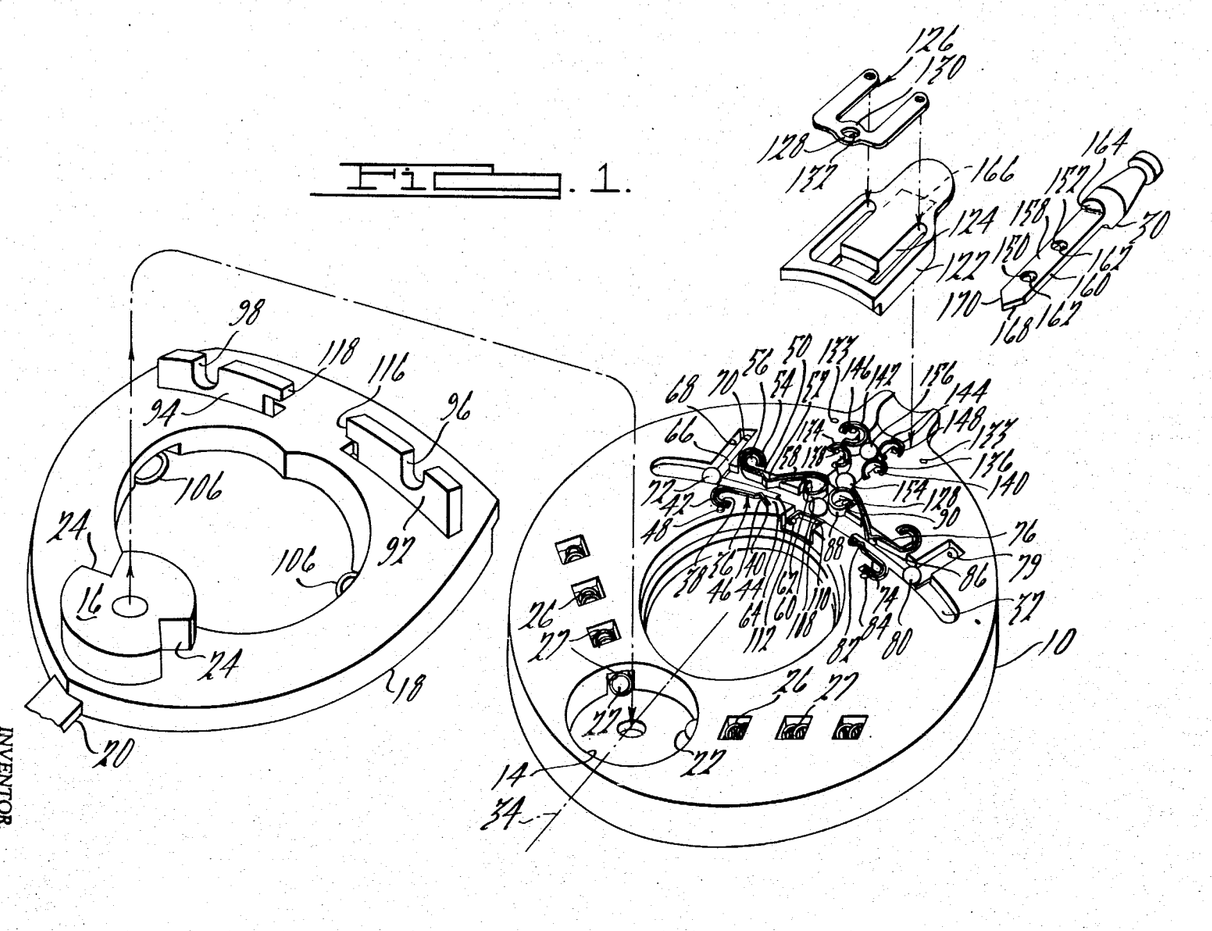
FIG. 1 is an exploded view of a preferred embodiment of the switch mechanism incorporating certain features of the present invention.
Figures 2, 3:
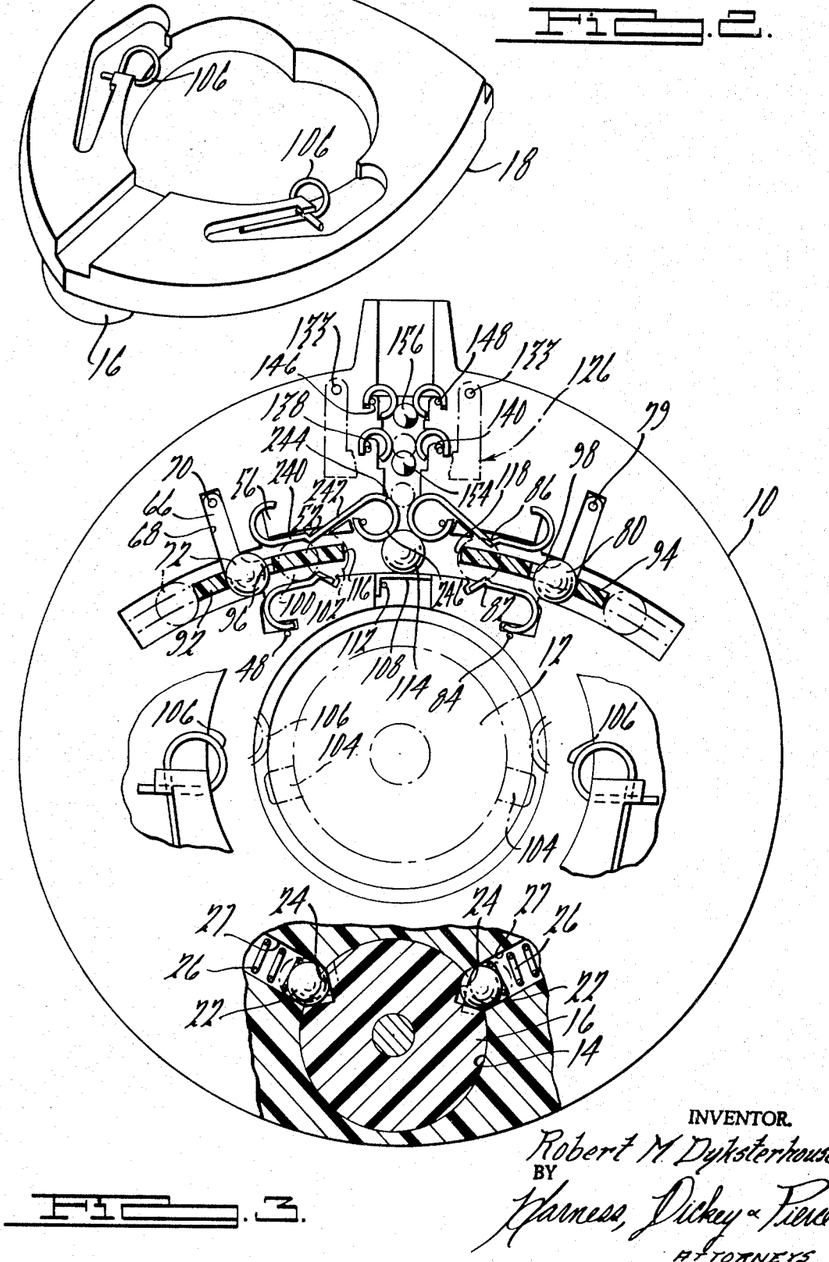
FIG. 2 is a top view of the actuator of FIG. 1 illustrating certain features of the return mechanism.
FIG. 3 is a plan view partially broken away of the actuator mechanism illustrating the relative positions of the contact balls during selected modes of operation.
Figure 4:
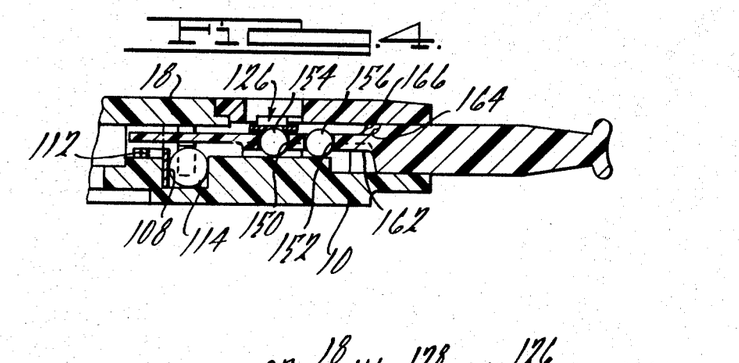
FIG. 4 is a cross-sectional view of the emergency, four-way flash actuating mechanism in the neutral position.
Figure 5:
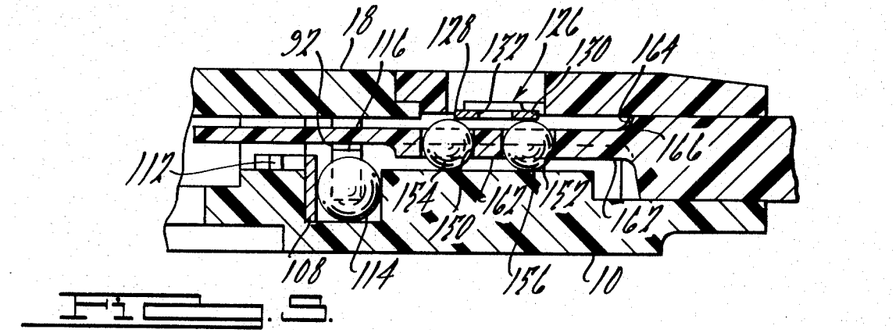
FIG. 5 is a cross-sectional view of a portion of FIG. 4 illustrating the four-way flash mechanism in the four-way flash mode of operation.
Figure 6:
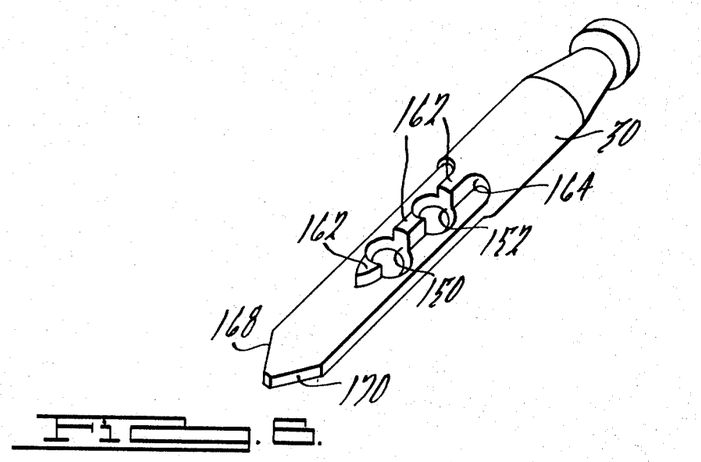
FIG. 6 is a perspective view of the four-way flash actuator handle as viewed from the bottom thereof.

At the right hand side of the centerline 34, as viewed in FIGS. 1 and 3 is a left turn contact group consisting of strip contacts 74, 76 and 78 and a ball contact 80, which group is a mirror image of the right turn group including contacts 36, 50 and 64, and a ball contact 80. The contact 74 has a detent 82 connected to a terminal post 84, and the contact 76 has a detent 86 and an end loop 88, adjacent the centerline 34, connected to a terminal post 90.

The positions of the contact balls 72 and 80 are determined by the actuator 18 which has a pair of spaced bosses 92 and 94 projecting into the slot 32 and are movable therealong during pivotal movement of the actuator 18 relative to the base 10. The bosses 92 and 94 have ball pockets 96 and 98 which receive the ball contacts 72 and 80, respectively, for sliding the balls 72, 80 within slot 32 during left and right movement of actuator 18. In the central or neutral position of the actuator 18, the ball contacts 72 and 80 are in the neutral positions shown in full lines in FIG. 3.

As the actuator 18 is pivoted by the handle 20 in a clockwise direction relative to the base 10 as viewed in FIG. 3, the ball 72 is rolled along the contact 64 into engagement with and between the contacts 36 and 50 into what may be called a "lane changing position" indicated at 100, in which it may be held by pressure on the handle 20, for a temporary indication of turning to the right as may be desired when moving to a lane to the right. If the handle 20 is released when the actuator 18 is in this lane changing position, it will return to its center or neutral position returning the ball contact 72 to its neutral position out of engagement with the contacts 36 and 50.

If, however, the driver continues to move the handle 20 to further move the actuator 18 counterclockwise relative to the base 10, the ball contact 72 will be moved past the detents 46 and 52 which upon release of the handle 20 will yieldably hold the actuator 18 against return to its neutral position. This normal or standard right turn position of ball contact 72 is indicated at 102 and, in this position (as in the lane change position 100), the ball contact 72 simultaneously engages the strip contacts 36, 50 and 64. It will be appreciated that during the above described movement of the ball contact 72, the ball contact 80 moves in the same direction, toward the adjacent end of the slot 32 and remains out of engagement with the contacts 74 and 76. From this normal right turn position the turn indication is cancelled in a conventional way by a cam 104 carried on the steering shaft 12 engaging a spring loop 106 on the actuator 18 to move the actuator 18 counterclockwise relative to the base 10. Thus, the ball contact 72 moves over the detents 46 and 52 and permits the actuator centering springs 26 to return the actuator 18 to its neutral position. It will be noted that the degree of arcuate movement of the drum 16 of actuator 18 relative to the balls 22 is considerably less than the arcuate movement of the ball 72 due to the closeness of the balls 22 to the pivot point on drum 16. Thus, the balls 22 do not completely leave the notches 24 to provide the return force.

In the preferred embodiment a brake contact strip 108 is mounted in the base 10 in a recess 110 provided on the centerline 34 at the inner side of the slot 32 and is connected to a terminal post 112. A brake contact ball 114 is mounted in the slot 32 on the centerline 34 engaging the brake contact strip 108 and between and in engagement with the loops 60 and 88 of the contacts 50 and 76. The actuator bosses 92 and 94 are provided with spaced oppositely facing abutments 116 and 118. Upon signalling a normal right turn, the abutment 116 is adapted to engage the brake ball contact 114 before the ball contact 72 is moved past the detents 46 and 52 to move the ball contact 114 out of engagement with the loop 60. Upon signalling a normal left turn, the abutment 118 similarly moves the ball contact out of engagement with the loop 88. In this way, the brake signal will be present on the left side during a right turn but the right turn signal will take precedence or override the brake signal. The opposite condition exists during a left turn.

The emergency flasher control member 30 is mounted in the base 10 for movement along the centerline 34 in a recess 120 defined by the base 10 and the base plate 122. The base plate 122 is recessed and apertured at 124 to receive a generally U-shaped emergency strip contact 126, the central portion of which is bifurcated to provide an inner strip portion 128 disposed adjacent the loops 60 and 88 of the contacts 50 and 76 and an outer strip portion 130, the strip portions 128, 130 forming a central opening 132. These portions 128 and 130 extend through the apertured base plate 122 and into recess 120 in which the emergency flasher control member 30 operates. One end of the emergency strip contact 126 is connected to a terminal post 133.

The base 10 also carries a pair of inner strip contacts 134 and 136 projecting into the recess 120 at opposite sides thereof and connected to terminal posts 138 and 140, respectively, and a pair of outer strip contacts 142 and 144 also projecting into the recess 120 at opposite sides thereof and connected to terminal posts 146 and 148, respectively. The emergency flasher control member 30 has a pair of spaced apertures 150 and 152 in which are mounted two ball contacts 154 and 156 which project above the upper surface 158 of an inner blade portion 160 of the member 30 for engagement with the portions 128 and 130 of the contact strip 126. The blade portion 160 has a downwardly extending central flange or ridge 162 for engaging and positioning the ball contacts 154 and 156.

The emergency flasher control member 30 is movable between an "off" position in which the inner ball contact 154 extends into the opening 132 in the contact strip and the ball contact 156 engages the contact strips 142 and 144, and an "on" position in which the ball contact 154 simultaneously engages the portion 128 of emergency strip contact 126 and loops 60 and 88 of contacts 50 and 76. The inner end of the blade portion 160 of the emergency flasher control member projects through the recess 110 above the brake contact 108 and is guided by the opposed side walls thereof. Inward movement of the member 30 is limited by engagement of a shoulder 164 thereon with a cooperating stop 166 on the base plate 122. The inner end of the member 30 has cam surfaces 168 and 170 adapted to be engaged by the steering shaft cam 104 for returning the member 30 to its off position upon rotation of the steering shaft when the emergency flasher control member 30 is in its on position.

The electrical circuit diagram for the preferred embodiment above described is illustrated in FIG. 7. The directional signal switch apparatus described above is represented by the portion of the diagram within the broken line rectangle 200. This device operates as a turn signal indicator through a standard flasher 202 connected to the vehicle battery by a conductor 204 and connected by conductor 206 to the terminal post 146 of contact 142.

The terminal post 148 of contact 144 is connected by conductor 207 to a conductor 208 which connects terminal post 70 of contact 64 to terminal post 79 of contact 78. Terminal post 48 of contact 36 is connected to a line 210 for supplying current to the right turn signal indicating lamps 212, 220 from flasher 202, ball 156 and conductor strip 64. Terminal post 84 of contact 74 is connected to a conductor 214 for supplying current to the left turn signal lamps 216, 224 from flasher 202, ball 156, and conductor strip 78.

Terminal post 62 of contact 50 is connected to a conductor 218 for supplying current to the right rear turn signal lamp 220 and terminal post 90 of contact 76 has connected thereto a line 222 for supplying current to the left rear turn signal indicating lamp 224 in the case of a brake signal. The brake strip contact terminal post 112 is connected to a source of battery voltage through a conductor 226, a brake switch 228 and a conductor 230. Thus, when the brake switch is closed by application of the brakes, current flows to the right and left rear lamps through switch 228, ball 114 and conductors 218 and 222, respectively. If a turn or lane change is indicated, the appropriate rear lamps are deprived of a brake indication because of the movement of ball 114.

It will now be appreciated that when the handle 20 is moved to move the ball contact 72 into engagement with the contacts 36 and 50, whether in the lane changing position 100 or in the normal turn position 102, a right turn is signalled by the completion of the circuits from the battery to the front and rear lamps 212 and 220. These circuits include a common portion from the battery through line 204, the standard flasher 202, the line 206, the contact 142, the ball contact 156, the contact 144, the lines 207 and 208, and the contact 64 to the ball contact 72. From the ball contact 72 the circuit to the front lamp 212 is through the contact 36 and the line 210 and the circuit to the rear lamp 220 is through the contact 50 and the line 218.

When the ball contact 72 is in its normal right turn position 102 the brake ball contact 114 is in its position shown in broken lines in FIG. 3 and if the brake switch 228 is closed the left rear lamp 224 is lit (continuously) by the completion of a circuit through line 230, brake switch 228, line 226, contact 108, ball contact 114, contact 76, and line 222 to left rear lamp 224. Since ball contact 114 is now out of contact with contact 50, the right rear lamp 220 continues to flash, unaffected by the closing of the brake switch 228.

When the emergency flasher control member 30 is moved to its on position it will be seen that the circuit is broken from the standard flasher 202 because the ball contact 156 has moved out of engagement with the contacts 142 and 144. However, circuits are completed through an emergency or heavy duty flasher 230 to all of the lamps 212, 216, 220 and 224. Tracing this circuit, energy flows from the emergency flasher 230 to the front lamps 212 and 216 through a conductor 232, the emergency strip contact 126, portion 130 thereof, ball contact 156 from which the circuit to lamp 212 is through contact 134, conductor 234 and conductor 210 and the circuit to lamp 216 is through contact 136, conductor 236, and conductor 214. Energy also flows from the emergency flasher 230 the circuits to the rear lamps 220 and 224, through line 232, emergency contact 126 and portion 128 thereof to ball contact 154 from which the circuit to lamp 220 is through contact 50 and line 218 and the circuit to lamp 224 is through contact 76 and line 222.

From the foregoing it will be appreciated that the improved turn signal indicator and emergency flasher device of the present invention is simple in construction, economical to manufacture, and reliable and efficient in operation. In the preferred embodiment illustrating the device, the part within the broken rectangle on the circuit diagram, FIG. 7, has seven wires connected to it, lines 206 and 232 for connection to the flashers 202 and 230, respectively, lines 210, 214, 218' and 222' for connection to the lamps 212, 216, 220 and 222, respectively, and line 226 for connection to the brake switch 228. The device also has five movable ball contacts 72, 80, 114, 154 and 156, two of which (ball contacts 72, 80) are movable by the actuator 18 for signalling lane changing turns and together with ball contact 114 are movable for indicating normal turns. The movement of the contact 114 prevents closing of the brake switch 228 from interfering with the flashing of the rear turn signal lamp.

The other two ball contacts 154, 156 are movable by the emergency flasher control member 30, the ball contact 156 being effective in the off position of the member 30 to complete a circuit through the standard flasher 202 and being effective in the on position of the member 30 to complete a circuit through the emergency flasher 230 to the front lamps 212, 216. The other ball contact 150 is inoperative in the off position of member 30 and, in the on position, it completes a circuit through the emergency flasher 230 to the rear lamps 220 and 224. It will be noted that in this embodiment the contacts 50 and 76 each have four contact functioning portions.

Referring to FIG. 3, illustrating contact 50, there is a first portion 240 disposed outwardly of the detent 52 and engaged by the ball contact 72 in signalling a line changing turn, a second portion 242 inwardly of the detent 52 and engaged by the ball contact 72 in signalling a normal turn, a third portion 244 on the outer side of loop 60 engaged by the ball contact 154 during operation of the emergency flasher 230, and a fourth portion 246 at the inner side of the loop 60 engaged by the brake ball contact 114 except when the actuator 18 is positioned for signalling a normal turn to the right. A similar situation occurs for the opposite contact 76. Thus, one contact element is utilized for several and varied purposes, i.e., to establish certain precedences of the various modes of operation of the switch. Thus, inter alia emergency four-way flash will take precedence over turn signal or lane changing modes, brake takes precedence over emergency flash and turn signal takes precedence over brake.

Figure 8:
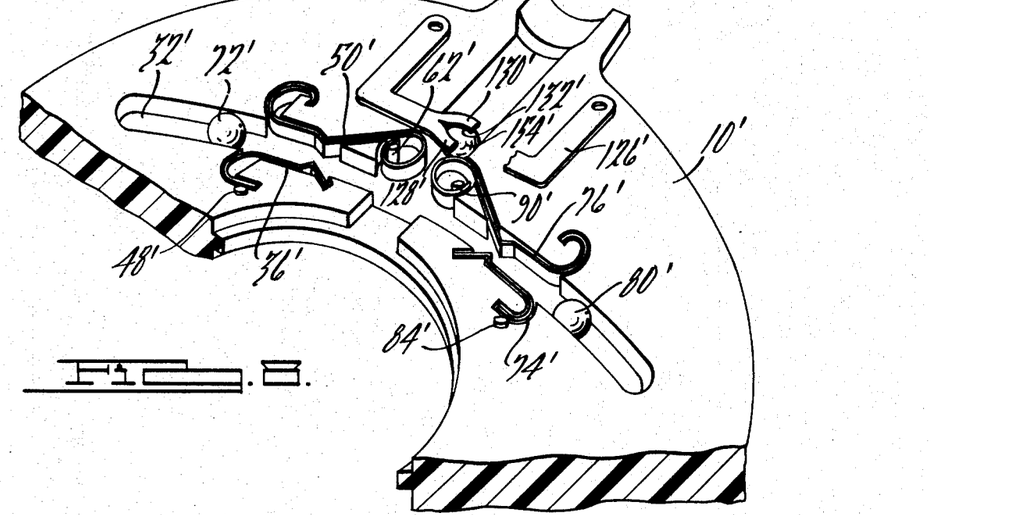
FIG. 8 is a modified form of the switch assembly of FIG. 1.
Figure 9:
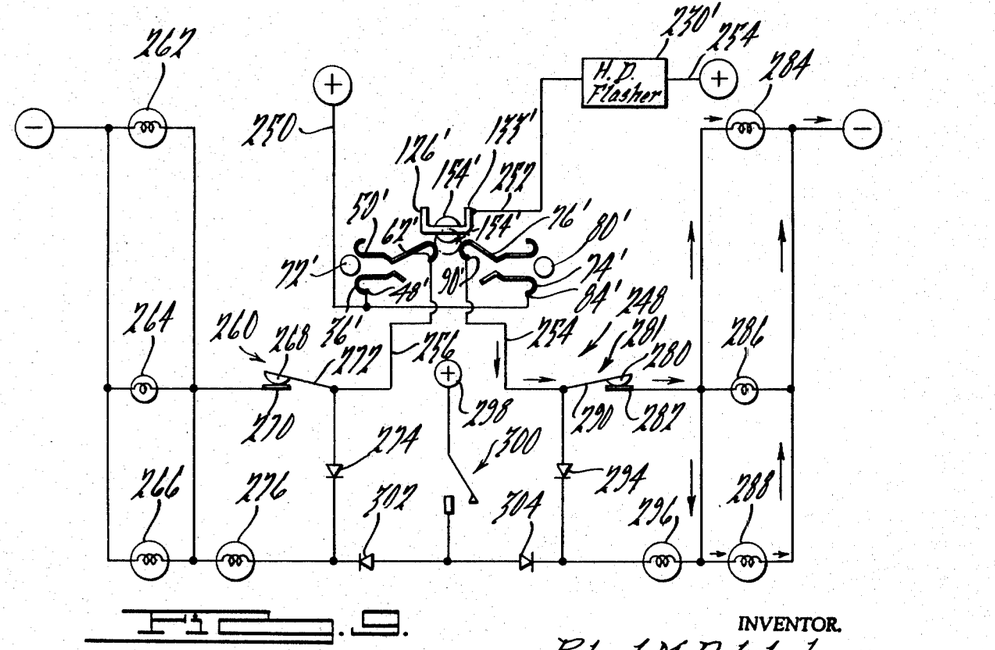
FIG. 9 is a schematic diagram of a modification of the system of FIG. 7 utilizing normal or standard flashers and is adapted to be utilized with the switch of FIG. 8. This circuit also illustrates a preferred form of sequencer.

There is also contemplated a modified form of the switch assembly and circuit described in FIGS. 1 to 7, the modified form being illustrated in FIGS. 8 and 9. As will be noted from the following description, FIG. 9 also illustrates a sequencer circuit which represents a preferred form of the sequencer concept. As will be seen from the description of FIGS. 8 and 9, the modified form permits the elimination of seven of the strip contacts and two of the ball contacts utilized in the system of the described FIGS. 1 to 7 through the use of dual flasher units and diode assembly generally indicated at 248. In this modified embodiment, with the exception noted, the construction and elements of the turn signal and emergency switch assembly are the same as those described in the first embodiment and are identified by the same reference characters with a prime added. It will be noted that the second embodiment omits the strip contacts 64, 74, 134, 136, 142, 144 and 108 and ball contacts 114 and 156. Also, the corresponding terminal posts of these strip contacts and the recess 68 and the aperture 152 are eliminated.

As in the first embodiment, the actuator element 18 is adapted to move ball contacts 72' and 80' in an arcuate fashion within the slot 32'. For a left hand turn, the ball 72 is moved into the area between contact strips 36' and 50' and thence past the detent portions to energize contact 50' from the electrical energy being fed to the strip 36'. The return mechanism described above will then cancel the signal being fed to the left turn lamps and return ball 72' to its original neutral position. For an opposite turn, the opposite condition exists with ball contact 80'. Thus, the turning and lane changing signals are presented to the circuitry 248 which will provide a pulsed output to the lamps as will be described hereinafter.

In the emergency four-way flash operation, the four-way flash actuator described above is pushed inwardly to move ball contact 154' from the position shown in FIG. 8 to a position in contact with strip contacts 50', 90'. As will be seen from the description of FIG. 9, a heavy duty flasher is connected to the U-shaped strip 126' thereby providing electrical energy from the strip 126' to the vehicle lamps through ball contact 154' and strips 50', 76'. It will be noted that the emergency four-way flash mode of operation will precede or take precedence over the turn signal mode of operation.

Referring now to FIG. 9, the turn signal switch assembly described in conjunction with FIG. 8 is illustrated in circuit with the battery and the vehicle lamps. Particularly, the terminal posts 48' and 84' of the strip contact 36' and 74' are interconnected by a conductor 250 to the vehicle battery and the emergency strip contact 126' is connected to the battery source through terminal 133', a conductor 152 and the heavy duty flasher circuit 230'. In this way, the energy from the battery and the emergency flash mode of operation is fed through the contact 126' and the ball contact 154' (shown in the dotted position) to the strip contacts 50' and 76'.

In the right turn mode of operation, the ball contact 80' is moved into contact with both the strip contact 74', 76' to energize an output conductor 254. On the other hand, for a left turn, the ball contact 72' is moved into contact with the strip contacts 48' and 50' to energize an output conductor 256. It will be noted that the energy being supplied to conductors 254, 256 solely as a result of the positioning of ball contact 72' and 80' will provide constant energization to the lines 254 or 256.

Referring first to the left turn signal, the conductor 256 is energized to supply energy to a flasher unit 260 which is connected in series with a left front lamp 262, a left pilot lamp 264 and a left rear lamp 266. Accordingly, upon initial energization of the line 256, energy will flow through the flasher unit 260, including a movable contact 268 and a stationary contact 270, to the parallel connected lamps 262, 264, 266. The arm 272, supporting the movable contact 268, is a thermally responsive element, such as a bimetal, which may be either self-heated by current flowing through the bimetal or may be provided with a separate heater to cause the bimetal to curl upwardly in response to current flowing across the closed contacts 268, 270. After a predetermined time lapse, the contacts 268, 270 will separate to open the circuit between conductors 256 and lamps 262, 264, 266. Current will then flow from the conductor 256, through a diode 274, to energize a lamp 276. However, insufficient current will then flow through lamps 262, 264, 266 to maintain the illumination of these latter lamps. Thus, upon actuation of the turn signal switch, lamp 266 will first be energized and then will be extinguished and lamp 276 will be energized. These latter two lamps will then sequence back and forth during the period that the left turn signal is signaled by the switch.

On the other hand, when a right turn signal is required, current will flow through a set of normally closed contacts 280, 282 to the corresponding parallel connected right lamps 284, 286 and 288. Upon heating of the bimetal arm 290, the contacts 280, 282 will open and current will flow through a diode 294 to an inboard lamp 296 to energize the inboard lamp 296 and deenergize the lamps 284, 286, 288.

A brake signal is provided from the battery source at input terminal 298 through a normally open brake switch 300. Upon closure of the brake switch 300, and assuming that neither turn signal switch is closed, current will flow through a diode 302 to the lamp 276, thus illuminating the lamp 276. On the other hand, current will also flow through a diode 304 to the illuminate lamp 296. It will be noted that the lamps 262, 264 and 266 and 284, 286 and 288 will not be illuminated in the brake mode of operation. It will be further noted that the closure of the turn signal switch after the closure of the brake switch 300 will cause lamp 276 to be extinguished due to the fact that the full battery voltage is applied to both ends of the lamp 276. However, the opposite side, in the case of a left turn, will be illuminated in the normal brake mode of operation.

In the emergency flash mode, the ball contact 154' bridges the gap between contact 126' and contacts 50', 76' to supply pulsed energy to the conductors 254, 256. In order to eliminate the effect of the flashers 260, 281, the duty cycle of the heavy duty flasher 230' is designed to be less than the duty cycles of flashers 260, 281. In this way the "on" time of the pulse from flasher 230' is insufficient to provide enough energy to open contacts 268, 270 and 280, 282.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. An automobile directional signal apparatus for use on an automobile having a right front light, a right rear light, a left front light, a left rear light, a source of electrical energy and a brake pedal switch connected to said source of electrical energy, said apparatus comprising at least one flasher adapted to be connected to said source of electrical energy, a right turn signal front light contact having a first portion and a second portion, an emergency right front light contact connected to said right turn signal front light contact, a right rear light contact having a first portion, a second portion, a third portion and a fourth portion, a right turn signal battery contact having a first portion and a second portion, a left turn signal front light contact having a first portion and a second portion, an emergency left front light contact connected to said left turn signal front light contact, a left rear light contact having a first portion, a second portion, a third portion and a fourth portion, a left turn signal battery contact having a first portion and a second portion, a brake switch battery contact having a first portion, a second portion and a third portion, a pair of flasher contacts, means connecting one of said flasher contacts to said right turn signal battery contact and to said left turn signal battery contact, a right turn ball contact, a left turn ball contact, a brake switch ball contact, an emergency flasher battery contact having a first portion and a second portion, an actuator having an inoperative position in which said brake switch ball contact interconnects said first portion of said brake switch battery contact and said third portions of rear light contacts and movable between a right lane change position in which said right turn ball contact is positioned to interconnect said right turn signal battery contact and said first portions of said right front light contact and said right rear light contact, a normal right turn position in which said right turn ball contact interconnects said right turn signal battery contact and said second portions of said right front light contact and said right rear light, a left lane change position in which said left turn ball contact interconnects said left turn signal battery contact and said first portions of said left front light contact and said left rear light contact and a normal left turn position in which said left turn ball contact interconnects said left turn signal battery contact and said second portions of said left front light contact and said left rear light contact, a first emergency ball contact, a second emergency ball contact, an emergency flasher control member movable between an off position in which said first emergency ball contact interconnects said pair of flasher contacts and an on position in which said first emergency ball contact interconnects said first portion of said emergency flasher battery contact and said emergency front light contacts and said second emergency ball contact interconnects said second portion of said emergency flasher battery contact and said fourth portions of said rear light contacts, means for urging said actuator to said inoperative position, detent means for yieldably holding said actuator in said normal turn position and cancelling means for returning said actuator from said normal turn positions in response to completion of a turn of said automobile.

2. In a vehicle signalling system for indicating a turn in either of two directions and for indicating an emergency condition and including a source of electrical energy, at least first, second, third and fourth indicating means and flasher switch means connected between the source of electrical energy and the indicating means, the improvement comprising first and second switch means normally open and alternatively operable manually to closed positions, third switch means movable between a first position in circuit with said first and second switch and a second position, and turn signal circuit means for connecting said first and second switch means between said source of electrical energy and said indicating means and through said third switch means when it is in said first position to energize said first and second indicating means when said first switch means is in closed position and to energize said third and fourth indicating means when said second switch means is in closed position, said first and second switch means including a pair of spaced contacts, a first movable contact movable between a center position in which it engages one of said spaced contacts of said first and second switches, a left position in which said movable contact is disposed while said device is indicating a left turn and in which it engages only one of said spaced contacts of one of said first and second switch means and a right position in which said movable contact is disposed while said device is indicating a right turn and in which it engages only the other of said spaced contacts of one of said first and second switch means.

3. The improvement of claim 2 wherein said first switch means also includes a second movable contact movable between an off position in which it engages neither of said pair of spaced contacts and an on position in which it engages both of said pair of spaced contacts.

4. The improvement of claim 3 further including brake circuit means for connecting said first switch means between said brake pedal switch and said first and third indicating means to energize said first and third indicating means when said first movable contact is in said center position and said second movable contact is in said off position, to energize only said first indicating means when said first movable contact is in said left position and said second movable contact is in said off position and to energize only said third indicating means when said first movable contact is in said right position and said second movable contact is in said off position.

5. The improvement of claim 4 further including emergency flasher circuit means for connecting said source of electrical energy to all of said indicating means through said flasher switch means and including circuit means for connecting said source of electrical energy to said first and third indicating means through said movable contact when it is in said on position.

6. The improvement of claim 2 further including a fourth switch movable between a first position in which it is disposed when said second movable contact is in said open position and a second position in which it is disposed when said second movable contact is in said closed position.

7. The improvement of claim 2 further including turn signal circuit means for providing a circuit from said turn signal flasher switch to said right front and rear lamps through said fourth switch when it is in said first position and through said first switch when it is in closed position and providing a circuit from said turn signal flasher switch to said left front and rear lamps through said fourth switch when it is in said first position and through said second switch when it is in closed position.

8. The improvement of claim 6 further including emergency flasher circuit means for connecting said emergency flasher switch to all of said lamps when said fourth switch is in said second position and said second movable contact of said third switch is in said closed position.

9. The improvement of claim 7 further including brake circuit means for connecting said brake pedal switch to both of said rear lamps when said first movable contact of said third switch is in said center position, for connecting said brake pedal switch to said left rear lamp when said first movable contact is in said right position, and for connecting said brake pedal switch to said right rear lamp when said movable contact is in said left position.

10. The improvement of claim 9 wherein said current responsive flasher means includes a thermally responsive element, said thermally responsive element adopted to be heated by current flowing through said flasher means.

11. The improvement of claim 9 wherein said flasher means includes a normally closed switch for shunting said second lamp.

12. The improvement of claim 11 wherein said heating causes said flasher switch to open to drive current through said second lamp.

13. The improvement of claim 12 wherein sufficient current flows in said light group when said flasher switch is closed and insufficient current flows in said light group when said flasher switch is open.

14. The improvement of claim 13 further including an emergency flash circuit including a normally open emergency switch and an emergency flasher, said flasher being connected in circuit with said lamp group when said emergency switch is closed.

15. The improvement of claim 14 wherein said lamp group, flasher means and emergency flasher are connected in series circuit, said emergency flasher means having a duty cycle which is less than the duty cycle of said flasher means.

16. The improvement of claim 13 further including a normally open brake switch operable to the closed position upon application of the vehicle brakes, said brake switch being connected in series with said lamp group and said second lamp, the application of said brakes causing said second lamp to be illuminated on said lamp group to at least appear non-illuminated.

* * * * *